United States Patent
Peng

(10) Patent No.: US 9,983,416 B1
(45) Date of Patent: May 29, 2018

(54) EYEGLASSES TEMPLE

(71) Applicant: Dongguan Zhongxin Rubber Products Co., LTD., Dongguan (CN)

(72) Inventor: Xue-Qing Peng, Dongguan (CN)

(73) Assignee: Dongguan Zhongxin Rubber Products Co., Ltd., Dongguan (CN)

( * ) Notice: Subject to any disclaimer, the term of this patent is extended or adjusted under 35 U.S.C. 154(b) by 0 days. days.

(21) Appl. No.: 15/407,090

(22) Filed: Jan. 16, 2017

(30) Foreign Application Priority Data

Nov. 28, 2016 (CN) .......................... 2016 1 1065936

(51) Int. Cl.
| | |
|---|---|
| *G02C 5/00* | (2006.01) |
| *G02C 5/20* | (2006.01) |
| *G02C 5/14* | (2006.01) |
| *G02C 5/18* | (2006.01) |
| *G02C 5/16* | (2006.01) |

(52) U.S. Cl.
CPC ............ *G02C 5/143* (2013.01); *G02C 5/008* (2013.01); *G02C 5/16* (2013.01); *G02C 5/18* (2013.01); *G02C 2200/14* (2013.01); *G02C 2200/20* (2013.01)

(58) Field of Classification Search
CPC ...... G02C 3/003; G02C 2200/10; G02C 5/00; G02C 5/146; G02C 5/143; G02C 5/008; G02C 5/18; G02C 5/16; G02C 2200/20; G02C 2200/14; G02C 5/20
USPC ........ 351/117, 66, 89, 93, 99, 100, 101, 111
See application file for complete search history.

(56) References Cited

U.S. PATENT DOCUMENTS

| | | | | |
|---|---|---|---|---|
| 1,599,871 | A * | 9/1926 | Boutelle .................. | G02C 5/00 351/114 |
| 5,007,726 | A * | 4/1991 | Suzuki ................... | G02C 5/008 351/122 |
| 6,598,969 | B2 * | 7/2003 | Asano ...................... | G02C 5/00 351/117 |
| 7,878,647 | B2 * | 2/2011 | Hardy .................... | G02C 5/146 351/114 |
| 2014/0375947 | A1 * | 12/2014 | Park ........................ | G02C 5/16 351/113 |

FOREIGN PATENT DOCUMENTS

GB 2055222 A * 2/1981 ............ G02C 3/003

* cited by examiner

*Primary Examiner* — Bumsuk Won
*Assistant Examiner* — Henry Duong
(74) *Attorney, Agent, or Firm* — Wang Law Firm, Inc.

(57) ABSTRACT

An eyeglasses temple includes a curved section and a support section coupled to the curved section. The curved section includes a metal member, upper and lower plastic members for wrapping the metal member, and a connector installed to an inner side of the support section and proximate to an eyeglasses frame. The metal member is made of a flexible iron material, the upper and lower plastic members are made of silicone and nylon respectively, and the support section is made of nylon. With the metal member made of a flexible iron material, the upper plastic member made of silicon, the lower plastic member made of nylon, and the support section made of nylon, the eyeglasses temple has a higher strength, and provides a friction between the eyeglasses temple and a wearer's ear to prevent the eyeglasses from sliding down or falling out from the wearer's nose bridge and ears.

6 Claims, 8 Drawing Sheets

EYEGLASSES TEMPLE

FIELD OF INVENTION

The present invention relates to an eyeglasses accessory, in particular to an eyeglasses temple.

BACKGROUND OF INVENTION

1. Description of the Related Art

Eyeglasses are a simple optical device for correcting vision and protecting eyes.

With the fast economic development, income and consumption are improved continuously, and the health awareness of consumers is also growing, and the demand for eyeglasses becomes increasingly higher.

Eyeglasses temple is a part of eyeglasses, and the eyeglasses temples are hanged on a wearer's ears when wearing the eyeglasses and provided for supporting an eyeglasses frame and fixing eyeglasses lenses. When the wearer has worn the eyeglasses for a long time, the eyeglasses frame and the eyeglasses temples may slide along or even fall down from the wearer's nose bridge or ears, when the wearer bends or does lots of exercisers.

Therefore, the conventional eyeglasses temples require further improvements.

2. Summary of the Invention

In view of the aforementioned drawback of the prior art, the inventor of the present invention based on years of experience in the related industry to conduct extensive research and experiment, and finally developed an eyeglasses temple that can be clipped secured to overcome the drawbacks of prior To achieve the aforementioned effect, the present invention provides an eyeglasses temple comprising a curved section and a support section coupled to the curved section, and the curved section further comprising a metal member and an upper plastic member and a lower plastic member for wrapping the metal member, and a connector installed at an inner side of the support section and proximate to an eyeglasses frame, and the metal member being made of a flexible iron material, and the upper and lower plastic members being made of silicone and nylon respectively, and the support section being made of nylon.

Further, the curved section has a length equal to two-thirds of the length of the eyeglasses temple.

Further, the curved section has a plurality of strip-shaped protrusions disposed parallelly on an inner side of an end that clips a wearer's ear.

Further, the upper plastic member and the lower plastic member have a binding surface which is a binding surface of a serrated structure, a concave-convex step structure, or a dovetail groove structure.

Further, the curved section has a plug section disposed at to an end proximate to the support section, and the plug section is plugged into a plug slot of the support section, and a groove is formed on an inner side of the plug section, and a spring is fixed to the bottom of the groove, and a lug is coupled to a free end of the spring, and the lug is configured to be corresponsive to at least two through holes formed on an inner groove wall of the plug slot of the support section.

Further, the spring has a guide column installed therein and coupled to the lug.

Further, the plug section has a guide protrusion formed on an inner side of the plug section, and the guide protrusion is capable of moving horizontally along a guide chute on the groove wall of the plug slot of the support section.

Compared with the prior art, the present invention has the following advantageous effects:

In the aforementioned structural design including the metal member made of a flexible iron material, the upper plastic member made of silicone and the lower plastic member made of nylon for wrapping the metal member, and the support section made of nylon, the eyeglasses temple has a higher strength. In addition, the eyeglasses temple provides a friction between the eyeglasses temple and a wearer's ear to prevent the eyeglasses from sliding down or falling out from the wearer's nose bridge and ears.

DESCRIPTION OF THE PREFERRED EMBODIMENTS

Figure 1:
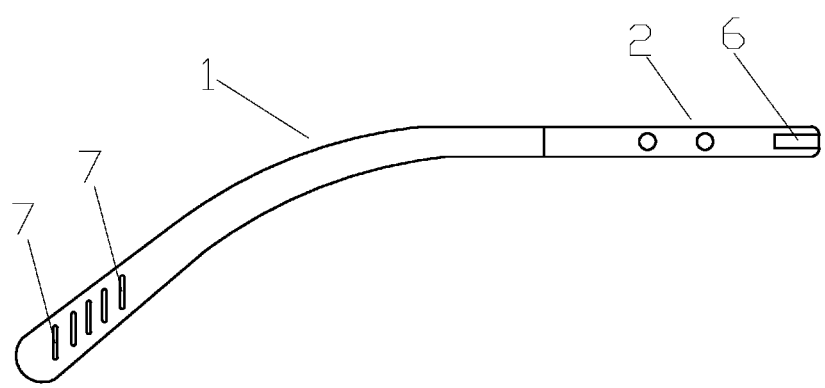
FIG. 1 is a schematic view showing the structure of an eyeglasses temple of the present invention.

The above and other objects, features and advantages of this disclosure will become apparent from the following detailed description taken with the accompanying drawings.

With reference to FIGS. 1 to 7 for an eyeglasses temple in accordance with a preferred embodiment of the present invention, the eyeglasses temple comprises a curved section 1 and a support section 2 coupled to the curved section 1, and the curved section 1 comprises a metal member 3 and an upper plastic member 4 and a lower plastic member 5 for wrapping the metal member 3, and a connector 6 installed to an inner side proximate to an end of the eyeglasses frame, wherein the metal member 3 is made of a flexible iron material, and the upper plastic member 4 and the lower plastic member 5 are made of silicone and nylon respectively, and support section 2 is made of nylon. In the aforementioned structural design including the metal member made of a flexible iron material, the upper plastic member made of silicone and the lower plastic member made of nylon for wrapping the metal member, and the support section made of nylon, the eyeglasses temple has a higher strength. In addition, the eyeglasses temple provides a friction between the eyeglasses temple and a wearer's ear to prevent the eyeglasses from sliding down or falling out from the wearer's nose bridge and ears.

The curved section 1 has a length equal to two-thirds of the length of the eyeglasses temple.

The curved section 1 has five strip-shaped protrusions 7 disposed parallelly on an inner side of an end that clips a wearer's ear and for further increasing the friction between the eyeglasses temple and the wearer's ear.

Figure 7:
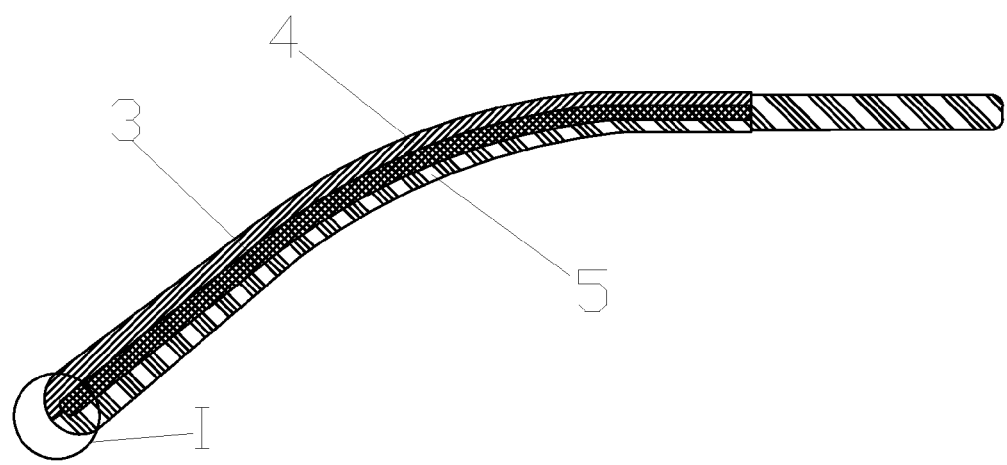
FIG. 7 is a cross-sectional view of Section A-A of FIG. 6.
Figure 8:
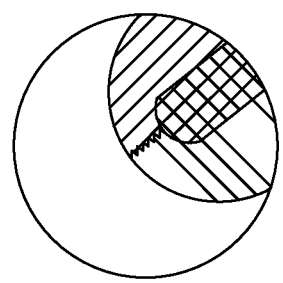
FIG. 8 is a blowup view of a part I of FIG. 7.

With reference to FIG. 7 for a preferred embodiment of the present invention, the binding surface of the upper plastic member and the lower plastic member is a binding surface of a serrated structure. To further improve the binding strength between the upper plastic member 4 and the lower plastic member 5, the binding surface may be a binding surface of a concave-convex step structure or a dovetail groove structure binding surface.

With reference to FIGS. 3 to 6 for a preferred embodiment of the present invention, a plug section 8 is disposed at an end of the curved section 1 near the support section 4, and the plug section 8 is plugged into a plug slot 9 of the support section 4, and the plug section 8 has a groove 10 formed on an inner side of the plug section 8, and a spring 11 is fixed to the bottom of the groove 10, and a lug 12 is coupled to a free end of the spring 11, and the lug 12 is configured to be corresponsive to two through holes 13, 14 formed on an inner groove wall of the plug slot 9 of the support section 4. In the initial status, the lug 12 is protruded and inserted into the through hole 13, so that when different wearers need to pull the lug 12, an external force is applied to the curved section 1, and the support section 2 to compress the lug 12. In the meantime, the spring 11 is compressed. Until the lug 12 is moved to the position of the through hole 14, the lug 12 is protruded and inserted into the through hole 14 by the action of the spring 11, so as to achieve the effect of extending the eyeglasses temple to meet different wearers' requirements of use.

Figure 6:
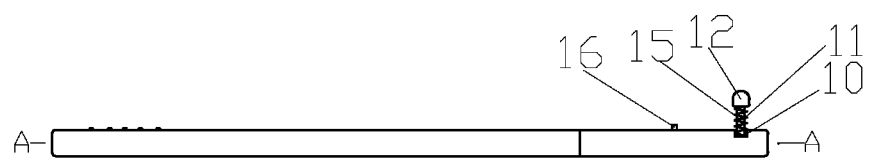
FIG. 6 is a front view of a curved section of the present invention.

With reference to FIG. 6, a guide column 15 is installed in the spring 11 and coupled to the lug 12. Since the support section 2 produces a friction to the lug 12 when the curved section 1 is pulled and stretched, therefore the design of the guide column 15 prevents the spring 11 coupled to the lug 12 from being bent or curved, so as to ensure the service life of the spring 11.

Figure 2:
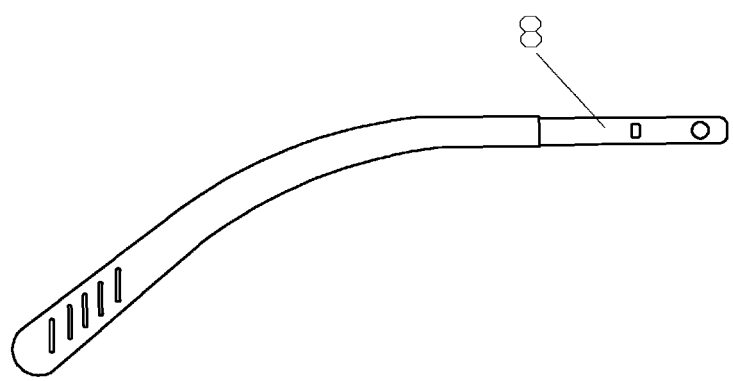
FIG. 2 is a side view of a curved section of the present invention.
Figure 3:
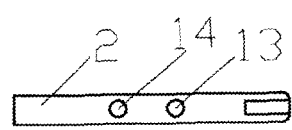
FIG. 3 is a side view of a support section of the present invention.
Figure 4:
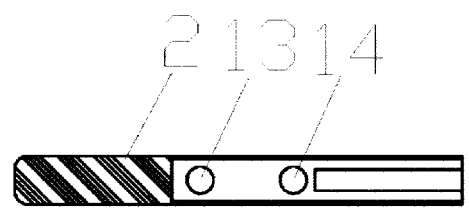
FIG. 4 is another side view of a support section of the present invention.
Figure 5:
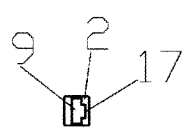
FIG. 5 is an end view of a support section of the present invention.

With reference to FIGS. 2 and 5, a guide protrusion 16 is disposed on an inner side of the plug section 8, and the guide protrusion 16 can be moved horizontally along a guide chute 17 formed on the slot wall of the plug slot 9 of the support section 4, and such design ensures the stability when the curved section 1 is pulled and stretched.

In summation of the description above, the aforementioned structural design of the present invention overcomes the drawback of the prior art including the unsecured clamping and poor practicality and has the features of preventing the eyeglasses temple from being loosened or falling out and providing a good practical application, and the present invention can be applied in various different eyeglasses, and thus has a high market value and a huge market potential.

While the invention has been described by means of specific embodiments, numerous modifications and variations could be made thereto by those skilled in the art without departing from the scope and spirit of the invention set forth in the claims.

What is claimed is:

1. An eyeglasses temple, comprising:
a curved section and
a support section coupled to the curved section, and
the curved section further comprising
a metal member, upper and lower plastic members for wrapping the metal member, and
a connector installed to an inner side of the support section and proximate to an eyeglasses frame, and
wherein
the metal member is made of a flexible iron material, and the upper and lower plastic member is made of silicone and nylon respectively, and the support section is made of nylon,
the curved section has a plug section disposed at an end proximate to the support section, and the plug section is plugged into a plug slot of the support section, and a groove with a bottom is formed on an inner side of the plug section, and a spring is fixed to the bottom of the groove, and a lug is coupled to a free end of the spring, and the lug is configured to be corresponsive to at least two through holes formed on an inner groove wall of the plug slot of the support section.

2. The eyeglasses temple of claim 1, wherein the curved section has a length equal to two-thirds of the length of the eyeglasses temple.

3. The eyeglasses temple of claim 1, wherein the curved section has a plurality of strip-shaped protrusions disposed parallel on an inner side of an end that clips a wearer's ear.

4. The eyeglasses temple of claim 1, wherein the upper plastic member and the lower plastic member have a binding surface which is a binding surface of a serrated structure, a concave-convex step structure, or a dovetail groove structure.

5. The eyeglasses temple of claim 1, wherein the spring has a guide column installed therein and coupled to the lug.

6. The eyeglasses temple of claim 1, wherein the plug section has a guide protrusion formed on an inner side of the plug section, and the guide protrusion is capable of moving horizontally along a guide chute on the groove wall of the plug slot of the support section.

* * * * *